(12) United States Patent
Cochran

(10) Patent No.: US 6,260,498 B1
(45) Date of Patent: Jul. 17, 2001

(54) ANCHOR CLEAT

(76) Inventor: Gary Thomas Cochran, 501 B. Kenilworth St., New Orleans, LA (US) 70124

( * ) Notice: Subject to any disclaimer, the term of this patent is extended or adjusted under 35 U.S.C. 154(b) by 0 days.

(21) Appl. No.: 09/649,323

(22) Filed: Aug. 28, 2000

(51) Int. Cl.⁷ .................................................. B63B 21/04
(52) U.S. Cl. ........................... 114/218; 24/130; 24/115 M
(58) Field of Search ............................ 114/218; 188/65.2, 188/65.4; 24/130, 136 R, 115 M

(56) References Cited

U.S. PATENT DOCUMENTS

| | | | |
|---|---|---|---|
| 3,574,900 | 4/1971 | Emery | 114/218 |
| 3,812,811 | 5/1974 | Rodriguez | 114/218 |
| 4,361,938 | 12/1982 | Emery | 114/218 |
| 5,987,711 | * 11/1999 | Parsons | 114/218 |

* cited by examiner

*Primary Examiner*—Jesus D. Sotelo
(74) *Attorney, Agent, or Firm*—Shawn Sentilles

(57) ABSTRACT

An anchor cleat for securing an anchor line comprising an elongated base, a one-way jamming cleat mounted on the base, and a skene chock mounted on the base adjacent a jamming end of the jamming cleat. The skene chock is preferably spaced sufficiently from the jamming end of the jamming groove to allow the anchor line to disengage from the jamming groove when the anchor line is inclined above the jamming groove at an angle of less than 25 degrees relative to the base. The jamming cleat comprises a pair of lengthwise opposing walls extending upward from the base, with a substantially V-shaped, ridged jamming groove formed by opposing internal faces of the pair of walls. The ridges are angled upward toward the release end of the jamming groove. The skene chock comprises a pair of spaced apart rigid arm members extending upward from the base, skene portions of each of the rigid arm member curving inward toward one another to thereby form an anchor line receiving aperture. The rigid arm members are offset from one another to thereby form a skene chock opening. The skene chock opening is of sufficient size to allow the anchor line to pass lengthwise through the skene chock opening. The foregoing configuration allows an anchor line to be reset while standing at a remote distance from the anchor cleat, and also allows the anchor line to be removed from the anchor cleat without untying the anchor from the line.

19 Claims, 3 Drawing Sheets

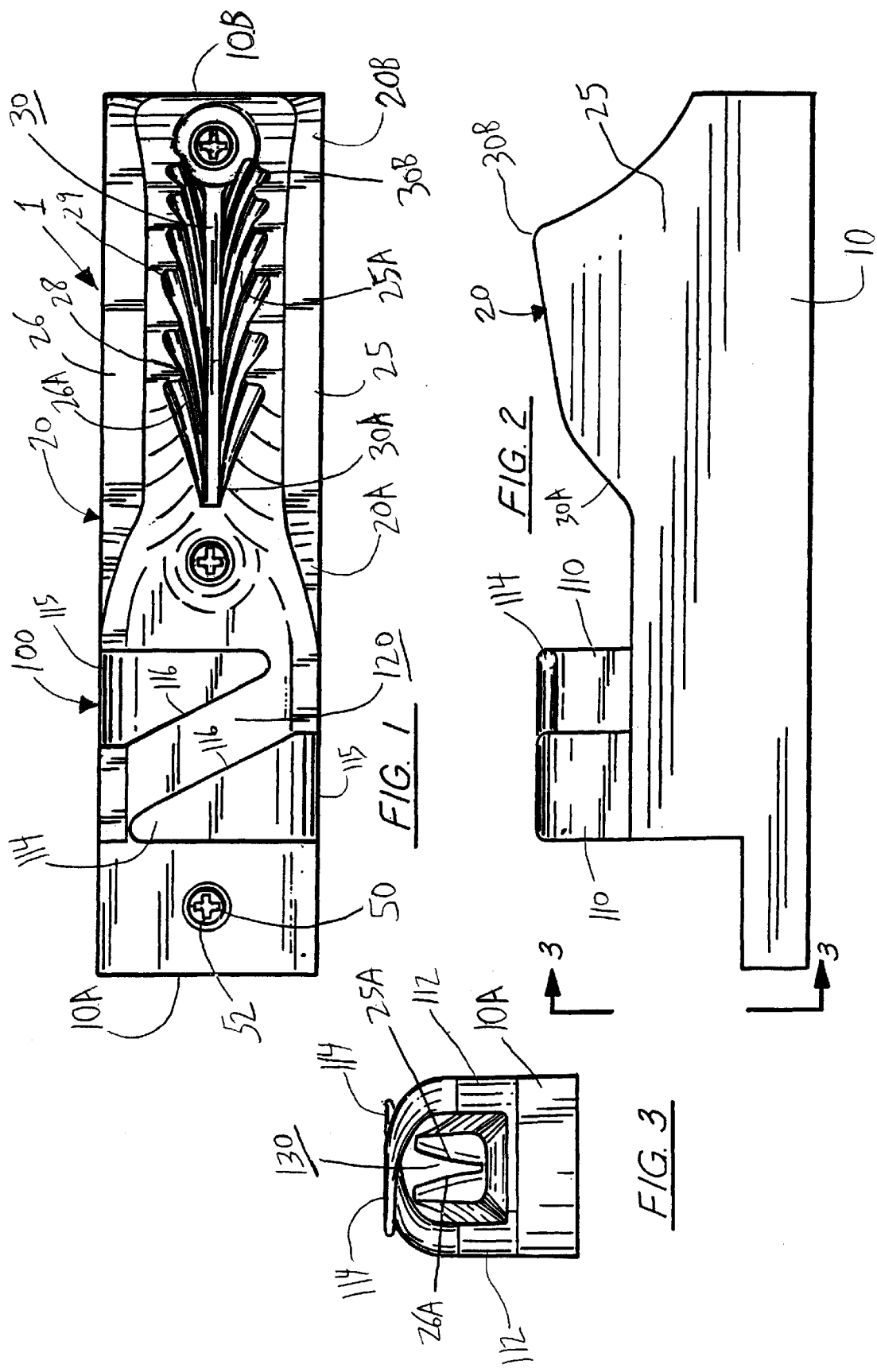

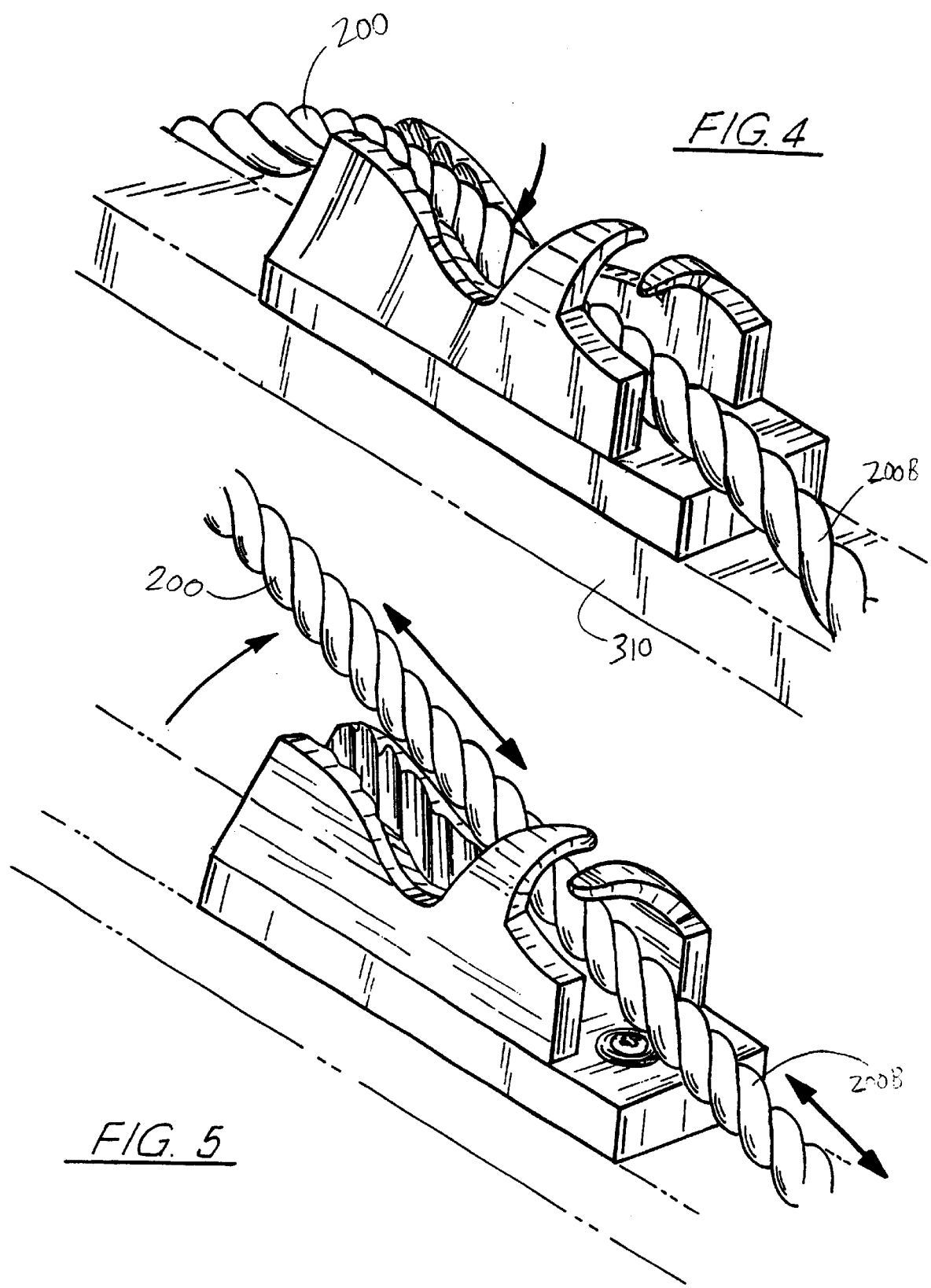

ANCHOR CLEAT

FIELD OF THE INVENTION

The present invention relates to line tying, retaining, and tensioning devices for boats, and more particularly to a cleat designed primarily for use in adjusting anchor lines.

BACKGROUND OF THE INVENTION

Boats are conventionally anchored by use of an anchor that is tied to one end of a line, such as a rope, cord or cable. The anchor is dropped into a water body from the boat, and the line is allowed to reel out from the boat until the anchor contacts the bottom of the water body or a solid structure on the bottom of the water body. The line is then secured to the boat, typically by tying the line to a base cleat mounted on the bow of the boat, in order to fix the length of the anchor line. As long as the anchor remains fixed at one location on the bottom of the water body, the boat will be secured in the vicinity of the anchor. Wind and currents may tend to move the boat back and forth or into a general location above the anchor, but the degree of movement of the boat will be limited by the length of the anchor line relative to the depth of the water above the anchor. For example, a twelve foot anchor line in ten feet of water will allow for very little movement of the boat, while a thirty foot anchor line in ten feet of water will allow the boat to drift away from the anchor and to swing in a relatively large arc around the anchor.

One problem encountered in setting anchors in the foregoing manner is that once the anchor is set, it may soon be discovered that it is desirable to increase or decrease the length of the anchor line. This problem is encountered particularly in recreational fishing, where an angler often wants to secure his or her boat at a precise location. After the anchor has been set and the angler has begun fishing, the angler frequently discovers that the boat is too close to or too far from the angler's desired location. Even an adjustment of five or ten feet in the location of the boat might significantly increase the angler's success and enjoyment. In order to adjust the length of the anchor line, it is necessary for the angler to put down his or her fishing rod, walk to the point of the boat where the anchor line is tied (typically the bow), untie the anchor line, take in or let out line, tie the line back to the cleat, and then walk back to the fishing rod to resume fishing. During this process, the angler may lose his or her perspective and orientation, and thus find it difficult to reposition the boat at the desired location. The process of resetting the anchor line detracts from the enjoyment of fishing, and may be disturbing to the fish in the vicinity of the boat, resulting in smaller catches of fish.

The inventor has discovered that the foregoing problems can be overcome by the use of modified jamming cleats. Jamming cleats, a.k.a. clam cleats or V-cleats, are well known, and are widely used on sail boats, where it is necessary to frequently adjust the length of lines that are attached to the sails. Jamming cleats employ a substantially V-shaped jamming groove formed between opposing walls, the jamming groove being configured to retain a sail rope. When a sail line is pulled through the jamming groove at an appropriate angle, the line becomes wedged at a depth in the V-shaped jamming groove that is sufficient to prevent the rope from sliding through the cleat, thus securing the rope. The sides of the jamming groove are typically provided with ridges that enhance gripping of the rope. Jamming cleats are particularly useful in situations where it is necessary to frequently adjust a sail rope, because the rope can be readily released from the clamp by simply pulling the rope upward from the jamming groove. The releasing properties of jamming cleats are utilized in U.S. Pat. No. 3,812,811 (B. Rodriguez), which discloses a pivotally mounted rope jamming cleat for sailboats having a pressure retarding action to the pivotal movement of the cleat and a releasing action at the full movement of the cleat to release the rope. When a strong wind is encountered, the cleat releases the sail rope automatically, preventing the possibility of capsizing the boat.

The present invention relates to a particular form of jamming cleat that, for lack of a commonly used term, can be called a "one-way" jamming cleat. One way jamming cleats have a remarkable ability to grip and hold a line that is pulled in one direction through the clamp (hereinafter the jamming direction) and to readily release the line when the line is pulled in the opposite direction (hereinafter the release direction). These functions are achieved by slanting the ridges in the jamming groove so that when a line is pulled through the jamming groove in the jamming direction, the line is guided downward in the V-shaped jamming groove until the line becomes jammed. When the line is pulled in the release direction, the slanted ridges guide the line upward to thereby release the line from the jamming groove. Preferred configurations and characteristics of one-way jamming cleats are described in detail in U.S. Pat. No. 3,574,900 (R. J. Emery) and U.S. Pat. No. 4,361,938 (H. Emery).

As far as the inventor is aware, no attempts have previously been made to use jamming cleats to secure anchor lines. The inventor, who is a recreational fisherman, has discovered that while prior art one-way jamming cleats are effective in securing anchor lines, they suffer from the same drawbacks as other forms of anchor cleats. In particular, an angler or boat operator must walk to the jamming cleat in order to adjust the anchor line, and particularly to replace the line in the jamming groove. The inventor has discovered that if the anchor cleat is mounted on the bow of the boat, an angler standing midship or at the stern of the boat can remove the anchor line from the jamming cleat by lifting up on the rope. However, once the line is removed from the groove, various factors, such as wind, movement of the boat, pulling by the angler on the line, and movement of the angler, cause the line to veer away from the jamming cleat. Veer occurs almost invariably unless the angler is standing close to the jamming cleat. Once the anchor line has veered from the jamming groove, it is difficult to replace the line in the jamming groove, and it is usually necessary to walk to the jamming cleat in order to do so.

U.S. Pat. No. 3,574,900 (R. J. Emery) shows a jamming cleat having a bridge 51a extending between the opposing walls of the jamming groove (See Column 3, lines 10–30, and FIGS. 5–10). The bridge 51a is positioned between the jamming ends of the walls. While the bridge 51a shown in R. J. Emery would serve to secure a line in the groove, it could not be used in a practical manner for adjusting anchor lines. The bridge 51a of R. J. Emery is solid, which would pose great difficulties if the R. J. Emery device were used with anchor lines. When an anchor is pulled out of the water after use, the anchor must be placed on the boat for storage. The bridge 51a of R. J. Emery would prevent the anchor from being removed easily for storage. The anchor could be drawn up to the bridge 51a, but no further. If stored in this position, the anchor could easily become caught on objects outside of the boat or could injure individuals on the boat. The only way to remedy this problem would be to either untie the anchor or pass the non-anchor end of the rope back through the opening formed by the bridge 51a. Neither of these solutions would be acceptable to recreational fishermen, who frequently store their anchor below deck when moving the boat, and who may use poles or rig hooks to tie off in lieu of an anchor.

Another important disadvantage of R. J. Emery with regard to anchor lines is that the bridge 51a is directly adjacent the jamming end of the jamming cleat. This configuration may work well on sail boats, but it will not work well for adjusting anchor lines. In this configuration, the bridge 51a impinges on the upward motion of the rope as soon as the rope is lifted upwards from the jamming groove. The bridge 51a imposes a pivot point directly adjacent the jamming end of the jamming cleat, and it is therefore necessary to lift the rope at a relatively steep angle in order to remove the rope from the jamming groove. In order to achieve this steep inclination, an individual must stand close to the jamming cleat; if the individual stands away from the jamming cleat, he or she will be unable to lift his or her hand high enough to successfully lift the rope from the jamming groove.

A further disadvantage of the bridge 51a embodiment of R. J. Emery when used for setting anchor lines is that the location of the bridge 51a reduces control over the anchor line adjustment process. If used with anchor lines, the steep inclination required by the bridge 51a embodiment of R. J. Emery would prevent controlled manual manipulation of the anchor line, and would result in frequent inadvertent settings of the anchor line at undesirable lengths. When setting an anchor line, tension remains in the line essentially at all times due to the weight of the anchor, currents, drift of the boat, etc. As soon as the line contacts the jamming groove, the tension in the anchor line tends to slide the anchor line in the jamming direction, thereby setting the line in the jamming groove almost instantaneously. Accordingly, the anchor line must be maintained outside of the jamming groove during setting of the anchor line. Because the bridge 51a of R. J. Emery is directly adjacent the jamming end of the jamming cleat, the bridge forces the line into the jamming end of the jamming groove as soon as the line is dropped or lowered toward the jamming groove, resulting in a sudden jamming of the line. Little manual manipulation and control of the anchor line is possible, which reduces the likelihood of setting the anchor line at a desired location.

There is thus a need for an anchor cleat that overcomes the foregoing failings and shortcomings of the prior art by allowing an angler or boater to readily adjust an anchor line while standing at virtually any location on a boat.

OBJECTS AND SUMMARY OF THE INVENTION

It is an object of the invention to provide an anchor cleat for facilitating securing, unsecuring, and adjustment of an anchor line.

It is another object of the invention to provide an anchor cleat that eliminates the need to untie an anchor line between adjustments of the line.

It is another object of the invention to provide an anchor cleat that permits an anchor line to be adjusted from an opposite end of a boat from where the anchor cleat is mounted.

It is another object of the invention to provide an anchor cleat that permits an anchor line to be easily removed from the boat and anchor cleat for storage of the line.

It is another object of the invention to provide an anchor cleat that secures an anchor line by causing the line to be progressively wedged into the cleat when the pull on the line is increased.

It is another object of the invention to provide an anchor cleat wherein an anchor line may be readily engaged and disengaged from a jamming cleat portion with minimum effort on the part of the user while retaining the line on the anchor cleat.

It is yet another object of the invention to provide methods of using the apparatus described herein.

These and other objects and advantages of the invention shall become apparent from the following general and preferred description of the invention.

Accordingly, an anchor cleat for securing an anchor line is provided comprising an elongated base, a one-way jamming cleat mounted on the base, and a skene chock mounted on the base adjacent the jamming end of the jamming cleat. The anchor cleat is preferably provided with a fastening means on the base, such as a bolt hole, for fixedly mounting the base on the boat. The anchor cleat is preferably molded as a one piece body. The skene chock is preferably spaced sufficiently from the jamming end of the jamming groove to allow the anchor line to disengage from the jamming groove when the anchor line is inclined above the jamming groove at an angle of less than 25 degrees relative to the base, and preferably when the anchor line is inclined above the jamming groove at an angle of less than 15 degrees relative to the base.

The jamming cleat comprises a pair of lengthwise opposing walls extending upward from the base, the jamming cleat having a substantially V-shaped jamming groove formed by opposing internal faces of the pair of walls. The V-shape formed by the internal faces of the walls preferably has an angle of between about 8 to 20 degrees, and most preferably of about 14 to 15 degrees. The jamming groove has a release end and a jamming end. Each of the internal faces of the walls has a plurality of ridges formed thereon. The ridges are angled upward toward the release end of the jamming groove at a ridge angle of between about 20 and about 60 degrees. The ridge angle is preferably between about 40 to 50 degrees. The internal faces of the walls preferably curve away from one another toward an apex of each the side wall. Each ridge of the jamming groove is preferably aligned with an opposing one of the ridges on the opposing internal wall face. The ridges preferably taper apart gradually toward the jamming end to thereby provide substantially uniform grip strength along the jamming groove. An upper edge of each of the walls preferably inclines downward toward the jamming end of the jamming groove to thereby provide substantially uniform grip strength along the jamming groove.

The skene chock comprises a pair of spaced apart rigid arm members extending upward from the base. Skene portions of each of the rigid arm member curve inward toward one another to thereby form an anchor line receiving aperture. The rigid arm members are offset from one another to thereby form a skene chock opening between the skene. The skene chock opening is of sufficient size to allow the anchor line to pass lengthwise through the skene chock opening. The skene chock opening is oblique or perpendicular to the jamming channel such that the anchor line must be shifted out of alignment with the jamming channel in order pass the anchor line through the skene chock opening to thereby remove the anchor line from the anchor line receiving aperture of the skene chock. The skene chock opening is preferably set at an angle of about 60 degrees relative to a longitudinal axis of the jamming groove. The skenes preferably have a substantially right-triangular configuration when viewed from above, with a base side of each triangular skene being parallel to one of the walls such that hypotenuse sides of the triangular skenes are substantially parallel to one another, the hypotenuse sides defining the skene chock opening.

In operation, the anchor cleat is used by fastening the anchor cleat on a boat, placing an anchor line in the anchor line receiving aperture of the skene chock such that the anchor end of the rope extends from the jamming end of the base, dropping the anchor into the water body and allowing the anchor to sink to a bottom of the water body, and securing the anchor line at a desired length by dropping the anchor line into the jamming groove to thereby jam the anchor line in the jamming groove. The anchor line is preferably placed in the anchor line receiving aperture of the skene chock by slipping the anchor line through the skene chock opening. The boat can be repositioned by lifting the anchor line from the jamming groove to thereby release the anchor line from the jamming cleat, sliding the anchor line through the anchor line receiving aperture until a new desired length of anchor line is reached, and re-securing the anchor line at the new desired length by dropping the anchor line back into the jamming groove to thereby jam the anchor line in the jamming groove. Repositioning can be achieved while standing at a remote distance from the anchor cleat. The anchor line can be removed from the anchor cleat by shifting the anchor line until the line can be passed through the skene chock opening, and passing the anchor line through the skene chock opening to thereby release the anchor line from the anchor cleat.

BRIEF DESCRIPTION OF THE DRAWINGS

FIG. 1 is a top plan view illustrating one embodiment of the invention.

FIG. 2 is a side view illustrating one embodiment of the invention.

FIG. 3 is a front side view of one embodiment of the invention viewed along 3—3 of FIG. 2.

FIG. 4 is a side perspective view of one embodiment of the invention showing a line secured in an anchoring position.

FIG. 5 is a side perspective view of one embodiment of the invention showing a line released from the anchoring position and being adjusted to a new position.

PREFERRED EMBODIMENTS OF THE INVENTION

Figure 6:
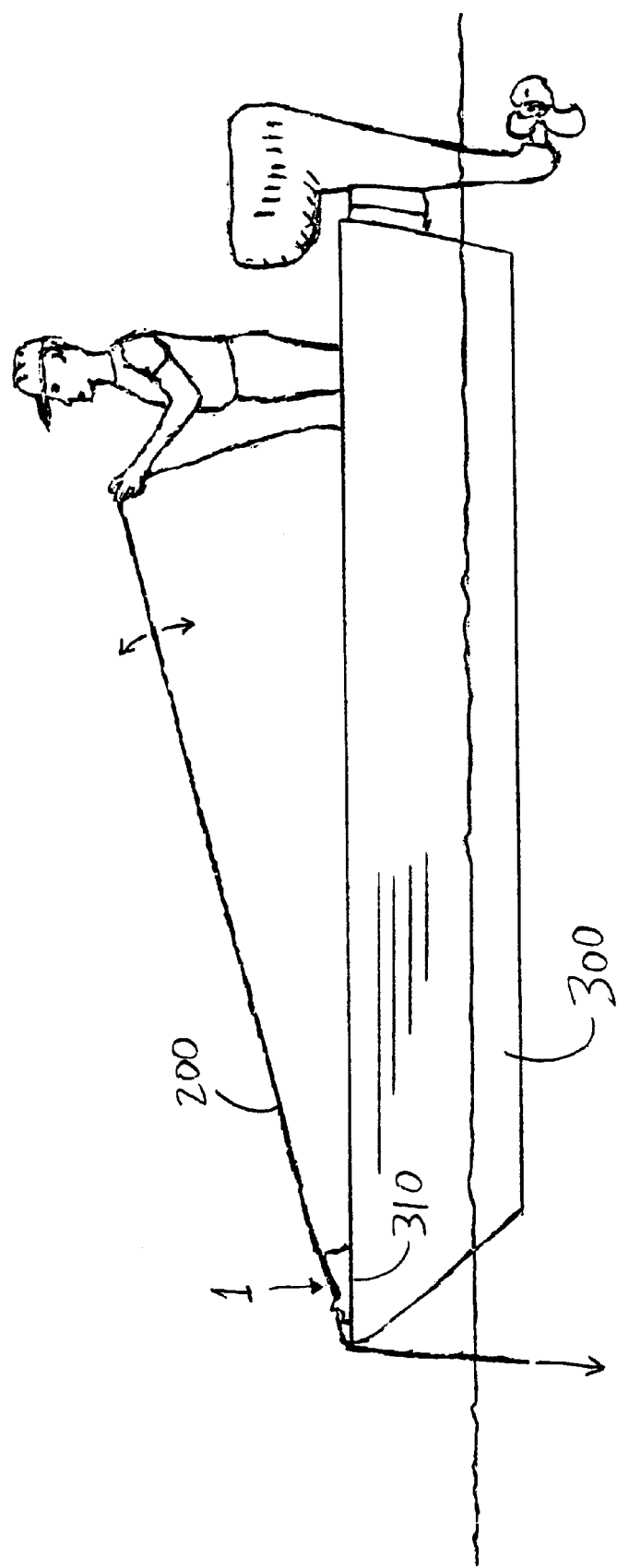
FIG. 6 is a side view showing a preferred configuration of the invention mounted on the bow of a boat, and showing an angler or boater using the invention to adjust the anchor line from the stem of the boat.

As shown in FIG. 1, the anchor cleat of the invention 1 is composed generally of a one-way jamming cleat 20 and a skene chock 100 located adjacent a jamming end 20A of the jamming cleat 20. The jamming cleat 20 and skene chock 100 are preferably mounted in fixed relation on a base member 10. The anchor cleat 1 is preferably molded as a one piece body incorporating both the jamming cleat 20 and the skene chock 100. The one piece molded anchor cleat 1 is preferably molded from a hard, durable plastic such as nylon, or from a metal such as aluminum or stainless steel.

As mentioned above, the basic configurations of one-way jamming cleats 20 are well known, and are widely used on sail boats. Appropriate configurations for a one-way jamming cleat 20 for use on the invention are disclosed in U.S. Pat. No. 3,574,900 (R. J. Emery) and U.S. Pat. No. 4,361,938 (H. Emery). The disclosures of these patents are specifically incorporated herein by reference.

The jamming cleat 20 has a base 10. A pair of walls 25, 26 extend upward from the base 10. The walls 25, 26 are substantially parallel to one another. A substantially V-shaped one-way jamming groove 30 is formed by opposing internal faces 25A, 26A of the walls 25, 26. The internal faces 25A, 26A of the walls 25, 26 may be straight, but are preferably curved such that the internal faces 25A, 26A curve or bend away from one another toward the apex of each side wall 25, 26, as shown in the frontal view of FIG. 3. The angle formed by the internal faces 25A, 26A of the walls 25,26 of the jamming groove 30 is ideally 14 to 15 degrees, preferably ranges from 8 to 20 degrees, and may range from 5 to 40 degrees, depending on the size and type of line used and the desired gripping strength of the cleat. The jamming groove 30 is rectilinear, as shown in FIG. 1. The jamming groove 30 has a jamming end 30A and a release end 30B.

Ridges 28 and grooves 29 are formed in the internal faces 25A, 26A of the walls 25, 26, as shown in detail in FIG. 1. The ridges 28 are preferably aligned with an opposing ridge 28 on the opposite wall 25, 26, as shown in the drawings, so as to cooperate in drawing a line 200 into or out of the jamming groove 30. Alternatively, the ridges 28 may also be formed in a staggered relationship. The ridges 28 are preferably rectilinear, but may be slightly curved. The peaks of the ridges 28 and the valleys of the grooves 29 are preferably rounded, as shown in FIG. 1. In the embodiment shown in FIG. 1, each ridge 28 of the jamming groove 30 has an apex angle of between 40 to 100 degrees, and preferably of 90 degrees. The ridges 28 may be of constant height, or they may decrease in height from the bottom to the top of the groove. The ridges 28 on each face of the walls 25, 26 are inclined upward relative to the longitudinal dimension of the base 10, with the slope of the ridge angle inclined upward toward the release end 30B of the jamming groove 30. The ridge angle is oblique to the alignment of the jamming channel 30. The ridge angle inclines upward from the jamming end 30A toward the release end 30B at an incline angle of 20 to 60 degrees, and preferably at an angle of 45 degrees. Generally speaking, the sharper the ridge angle the stronger the grip on the line 200.

The distance between corresponding opposing ridges 28 may decrease slightly toward the release end 30B of the jamming groove 30, with the ridges 28 tapering apart toward the jamming end 30A. A tapered groove ridge promotes substantially uniform grip strength along the jamming groove 30, as detailed in H. Emery (see column 3). As described in H. Emery, a 3 degree ridge taper provides optimum gripping along the length of the jamming groove 30. The upper edges of the walls 25, 26 may incline slightly downward toward the jamming end 30A of the jamming groove 30, a configuration that tends to provide uniform grip strength along the length of the jamming groove 30.

The ridges 28 cause the anchor line 200 to become progressively wedged deeper into the jamming groove 30 as the pull on the line 200 is increased toward the jamming direction 20A. In a well formed jamming cleat 20, a line placed in the jamming groove 30 and pulled toward the jamming end 30A of the jamming groove 30 will almost instantaneously become anchored in the jamming groove 30. Anchoring occurs when the line 200 has been pulled downward to a point in the jamming groove at which the ridges 28 sufficiently compress or deform the line 200 to prevent the line 200 from sliding through the jamming groove 30. Once that point is reached, application of additional pulling force on the line 200 will serve to pull the line 200 deeper into the jamming groove 30.

Anchor lines on recreational boats are typically ⅜ inch to ⅝ inch in diameter. Because the jamming channel 30 is substantially V-shaped, the jamming channel 30 of a particular jamming cleat 20 can be sized so that the jamming channel 30 effectively holds a range of anchor line sizes, including ⅜ inch and ⅝ inch lines. Thicker ropes will lodge higher in the jamming channel 30, while thinner ropes will lodge deeper in the channel 30. It is anticipated that the anchor cleat of the invention 1 may also find use on large fishing boats, commercial, or military vessels, in which case the dimensions of the anchor cleat 1 would generally increase proportionately to the size of the anchor line used.

The anchor cleat 1 has a base 10, the base 10 providing a means for maintaining the walls 25, 26 in spaced apart relation. The base has a jamming end 10A and a release end 101B. The base 10 is preferably provided with two or more bolt apertures 50, so that the anchor cleat 1 can be secured to the boat 300 by a fastening means 52 such as bolts, rivets or screws. The anchor cleat 1 can be attached to the boat 300 by means other than bolting, such as welding, gluing, or clamping, provided that the anchor cleat 1 is sufficiently secured to withstand the rigors imposed by tension on the anchor line 200. The base 10 is preferably about 8 inches (20 cm) long. This length allows the base to fit on the edge, side rail, or bow deck of conventional recreational fishing boats. The height of the base 10 is preferably selected so that the anchor cleat 1 is raised a sufficient level to allow the anchor line to enter the water without undue obstruction (e.g. from a raised side rail). For most recreational applications, a base height of about one-half to one inch (1 to 3 cm) will be appropriate.

The skene chock 100 component of the invention comprises a pair of spaced apart rigid arm members 110 that curve or converge inward toward one another to form a rope receiving aperture 130, as shown most clearly in FIG. 3. As shown in FIG. 3, each arm member 110 preferably has an upright support portion 112 and a lateral skene portion 114, the upright support portion 112 and the lateral skene portion 114 together forming a generally hook-like configuration, such as a J-shape, an L-shape, or a horn shape. At least a portion of the skene portion 114 is preferably substantially perpendicular to the upright support portion 112.

As shown most clearly in FIG. 1, the rigid arm members 110 of the skene chock are offset from one another, such that a chock opening 120 is formed between the skenes 114. The chock opening 120 is of sufficient size to allow a rope or other line 200 to be inserted through the chock opening 120. As shown in FIG. 1, the skene chock opening 120 is oblique or perpendicular to the jamming channel 30, such that the rope 200 must be shifted out of alignment with the jamming channel 30 in order to remove the rope 200 from the rope receiving aperture 130 of the skene chock 100. The skene chock opening 120 is preferably set at an angle of about 60 degrees relative to the longitudinal axis of the base 10 and jamming groove 30, as shown in the top view of FIG. 1. Although the skenes 114 may be of various configurations, FIG. 1 shows a preferred embodiment in which the skenes 114 have a substantially right-triangular configuration when viewed from above. A right triangular configuration allows the base side 115 of each triangular skene 114 to be set parallel to the walls 25, 26, such that the hypotenuse sides 116 of the triangular skenes 114 are set substantially parallel to one another, the hypotenuse sides 116 forming the edges 116 of the skene chock opening 120.

In order to achieve the objectives of the invention 1, the skene chock 100 is positioned adjacent the jamming end 20B of the jamming cleat 20. The skene chock 100 is positioned a sufficient distance from the jamming end 20B of the jamming cleat 20 to permit a line 200 to be lifted out of the jamming channel 30 and to also retain the lifted rope substantially in alignment with the jamming channel 30, such that the rope 100 can be readily dropped back into the jamming channel. The line 200 can be allowed some side-to-side play relative to the jamming channel 30, provided that a user of the invention can rely upon the skene chock 100 for assistance in successfully returning the line 200 to the jamming channel 30. If the skene chock 100 is positioned too close to the jamming end 30A of the jamming channel 30, it becomes difficult to insert and remove the line 200 from the skene chock 100. If the skene chock 100 is positioned too close to the jamming end 30A of the jamming groove 30, it also becomes difficult or impossible to lift the line 200 a sufficient distance above the jamming groove 30 to release the rope from the ridges 28, particularly when standing far from the anchor cleat 1. Conversely, if the skene chock 100 is positioned too far away from the jamming cleat 20, the skene chock 100 becomes less effective or ineffective in retaining the line 200 substantially in alignment with the jamming channel 30. The skene chock 100 is preferably located at least two widths of a line 200 in distance from the jamming end 30A of the jamming groove 30. The skene chock 100 is preferably sufficiently spaced from the jamming end 30A to allow the anchor line 200 to disengage from the jamming groove 30 when the line is inclined at an angle of less than 25 degrees relative to the base 10, and preferably when inclined at less than about 15 degrees, as shown in the side view of FIG. 6. This inclination allows boaters and anglers of average size to easily remove the line 200 from the jamming groove 30 even when standing in the stem of a standard length recreational fishing boat. FIGS. 1–5 show a preferred configuration in which the jamming cleat 20 and the skene chock 100 are mounted in fixed relation on a base member 10.

In the preferred embodiment shown in FIGS. 1–5, the skene chock 100 is mounted on the same base 10 as the jamming cleat 20. This preferred configuration allows the anchor cleat 1 to be molded in a unitary form in which the various dimensions of the anchor cleat can be selected for optimum effect. However, the jamming cleat portion 20 and the skene chock portion 100 could be unconnected (i.e. not share a common base 10). In the unattached embodiment, the skene chock portion 100 would be attached to the boat adjacent the jamming end 20A of the jamming cleat 20, in accordance with the considerations discussed above. Additionally, the anchor cleat 1 may be formed as an integral part of another component, such as a boat rail or a bow deck.

As shown in FIGS. 4 and 5, in operation the anchor cleat 1 of the invention is used by first mounting the anchor cleat on a boat 300 by a fastening means 52, such as screws, bolts, rivets, glue, or welding. The anchor cleat 1 is preferably mounted on a rail or deck adjacent an edge of the boat 300, so that an anchor line 200 can be secured on the cleat 1 without interfering with movement of users of the boat and without undue rubbing against structures of the boat. The anchor line 200 is inserted into the anchor line receiving aperture 130 of the skene chock 100, preferably by slipping the line 200 through the skene chock opening 120. The skene chock opening 120 allows the anchor line 200 to be inserted into the anchor line receiving aperture 130 either while the anchor is in the boat 300 or while the anchor is in the water body. Once the anchor is secured on the bottom of the water body, the boater or angler can allow the anchor line 200 to run out until a desired boat position is achieved. If necessary, the boater or angler can use a motor, trolling motor, or paddle to assist in letting out or taking in anchor line 200. During positioning of the boat, the line 200 is preferably held above the jamming groove 30, so that jamming of the anchor line 200 can be readily achieved once the boat 300 has reached a desired position. Once the boat 300 is in a desired position, the anchor line 200 is dropped down into the jamming groove 30 of the jamming cleat 20. Under the tension created on the anchor line 200 by the boat 300 and the anchor, the anchor cleat 1 will immediately hold the anchor line 200, thus setting the anchor line 200 at the desired length.

The anchor line 200 can be adjusted easily by pulling back on the stern end 200B of the anchor line 200 to loosen the line 200 from the ridges 28 of the jamming groove 30, and then lifting the line 200 up and out of the jamming groove 30. With the anchor line 200 removed from the jamming groove 30, the line 200 can be pulled to shorten the anchor line 200. Alternatively, slack can be given out to lengthen the line. In order to lengthen the line 200, it may be necessary to move the boat 300. Movement of the boat 300 can be achieved by relying on wind or water current in appropriate conditions, or through use of a trolling motor, a boat motor, a paddle or the like. Once the boat 300 has been moved to a desired position, the length of the anchor line 200 is re-set by dropping the anchor line 200 back into the jamming groove 30. Due to the configuration of the anchor cleat 1, re-setting of the anchor line 200 can be achieved while standing at a remote distance from the anchor cleat 1, as shown in FIG. 6.

When the boater or angler is ready to take in the anchor in order to move the boat 300 to a new location, the boater or angler raises the line 200 from the jamming groove 30 to release the line 200 from the jamming cleat 20, and then pulls back on the line 200 to retrieve the anchor from the water body. The line 200 can be removed from the anchor cleat 1 either prior to or after retrieval of the anchor from the water body. The line 200 is removed from the anchor cleat 1 by shifting the anchor line 200 until the line 200 can be passed through the skene chock opening 120. Once the anchor is back on the boat, it will generally be preferable to remove the anchor line 200 from the anchor cleat 1 so that the anchor can be stored in a safe and convenient location until later use.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An anchor cleat for securing an anchor line on a boat comprising:

an elongated base, a one-way jamming cleat mounted on said base, said jamming cleat comprising a pair of lengthwise opposing walls extending upward from said base, a substantially V-shaped jamming groove formed by opposing internal faces of said pair of walls, said jamming groove having a release end and a jamming end, each of said internal faces having a plurality of ridges formed thereon, said ridges being angled upward toward said release end of said jamming groove at a ridge angle of between about 20 and about 60 degrees;

a skene chock mounted on said base adjacent said jamming end of said jamming groove, said skene chock comprising a pair of spaced apart rigid arm members extending upward from said base, skene portions of each said rigid arm member curving inward toward one another to thereby form an anchor line receiving aperture, said rigid arm members being offset from one another to thereby form a skene chock opening between said skenes, said skene chock opening being of sufficient size to allow said anchor line to pass lengthwise through said skene chock opening, and said skene chock opening being oblique or perpendicular to said jamming channel such that said anchor line must be shifted out of alignment with said jamming channel in order pass said anchor line through said skene chock opening to thereby remove said anchor line from said anchor line receiving aperture of said skene chock.

2. The apparatus of claim 1, wherein said anchor cleat is molded as a one piece body.

3. The apparatus of claim 1, wherein said internal faces of said walls curve away from one another toward an apex of each said side wall.

4. The apparatus of claim 1, wherein said V-shape formed by said internal faces of said walls has an angle of between about 8 to 20 degrees.

5. The apparatus of claim 1, wherein said V-shape formed by said internal faces of said walls has an angle of between about 14 to 15 degrees.

6. The apparatus of claim 1, wherein each said ridge is aligned with an opposing one of said ridges on said opposing internal wall face.

7. The apparatus of claim 1, wherein said ridge angle is between about 40 to 50 degrees.

8. The apparatus of claim 1, wherein said ridges taper apart gradually toward said jamming end to thereby provide substantially uniform grip strength along said jamming groove.

9. The apparatus of claim 1, wherein an upper edge of each of said walls inclines downward toward said jamming end of said jamming groove to thereby provide substantially uniform grip strength along said jamming groove.

10. The apparatus of claim 1, further comprising a fastening means on said base for fixedly mounting said base on said boat.

11. The apparatus of claim 1, wherein said skene chock opening is set at an angle of about 60 degrees relative to a longitudinal axis of said jamming groove.

12. The apparatus of claim 1, wherein said skenes have a substantially right-triangular configuration when viewed from above, a base side of each said triangular skene being parallel to one of said walls such that hypotenuse sides of said triangular skenes are substantially parallel to one another, said hypotenuse sides defining said skene chock opening.

13. The apparatus of claim 1, wherein said skene chock is spaced sufficiently from said jamming end of said jamming groove to allow said anchor line to disengage from said jamming groove when said anchor line is inclined above said jamming groove at an angle of less than 25 degrees relative to said base.

14. The apparatus of claim 1, wherein said skene chock is spaced sufficiently from said jamming end of said jamming groove to allow said anchor line to disengage from said jamming groove when said anchor line is inclined above said jamming groove at an angle of less than 15 degrees relative to said base.

15. A method of anchoring a boat in a water body using an anchor attached to an anchor end of an anchor line comprising:

providing an anchor cleat, said anchor cleat comprising,
  an elongated base having a jamming end and a release end,
    a one-way jamming cleat mounted on said base closer to said release end than said jamming end, said jamming cleat comprising a pair of lengthwise opposing walls extending upward from said base, a substantially V-shaped jamming groove formed by opposing internal faces of said pair of walls, said jamming groove having a release end and a jamming end, said release end of said jamming groove corresponding to said release end of said base, each of said internal faces having a plurality of ridges formed thereon, said ridges being angled upward toward said release end of said jamming groove at a ridge angle of between about 20 and about 60 degrees;
    a skene chock mounted on said base adjacent said jamming end of said jamming groove, said skene chock comprising a pair of spaced apart rigid arm members extending upward from said base, skene portions of each said rigid arm member curving inward toward one another to thereby form an anchor line receiving aperture, said rigid arm members being offset from one another to thereby form a skene chock opening between said skenes, said skene chock opening being of sufficient size to allow said anchor line to pass lengthwise through said skene chock opening, and said skene chock opening being oblique or perpendicular to said jamming channel such that said anchor line must be shifted out of alignment with said jamming channel in order pass said anchor line through said skene chock opening to thereby remove said anchor line from said anchor line receiving aperture of said skene chock;

fastening said anchor cleat on said boat;

placing said anchor line in said anchor line receiving aperture of said skene chock such that said anchor end of said rope extends from said jamming end of said base;

dropping said anchor into said water body and allowing said anchor to sink to a bottom of said water body;

securing said anchor line at a desired length by dropping said anchor line into said jamming groove to thereby jam said anchor line in said jamming groove.

16. The method of claim 15, wherein said step of placing said anchor line in said anchor line receiving aperture of said skene chock is achieved by slipping said anchor line through said skene chock opening.

17. The method of claim 15, further comprising repositioning said boat by lifting said anchor line from said jamming groove to thereby release said anchor line from said jamming cleat, sliding said anchor line through said anchor line receiving aperture until a new desired length of anchor line is reached, and re-securing said anchor line at said new desired length by dropping said anchor line back into said jamming groove to thereby jam said anchor line in said jamming groove.

18. The method of claim 17, wherein repositioning is achieved while standing at a remote distance from said anchor cleat.

19. The method of claim 17, further comprising removing said anchor line from said anchor cleat by shifting said anchor line until said line can be passed through said skene chock opening, and passing said anchor line through said skene chock opening to thereby release said anchor line from said anchor cleat.

* * * * *